(12) United States Patent
Schwarz et al.

(10) Patent No.: US 9,282,272 B2
(45) Date of Patent: Mar. 8, 2016

(54) DEVICE FOR PROCESSING ELECTRONIC PROGRAM GUIDE DATA TO BE DISPLAYED BY AN ELECTRONIC EQUIPMENT WITHIN PAGES ASSOCIATED TO TIME REFERENCES

(75) Inventors: Emmanuel Schwarz, Marly-le-Roi (FR); Benjamin Novi, Paris (FR)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1418 days.

(21) Appl. No.: 11/995,825

(22) PCT Filed: Jul. 10, 2006

(86) PCT No.: PCT/IB2006/052328
§ 371 (c)(1),
(2), (4) Date: Jan. 16, 2008

(87) PCT Pub. No.: WO2007/010433
PCT Pub. Date: Jan. 25, 2007

(65) Prior Publication Data
US 2008/0216121 A1 Sep. 4, 2008

(30) Foreign Application Priority Data
Jul. 22, 2005 (EP) .................. 05300611

(51) Int. Cl.
*G06F 3/00* (2006.01)
*G06F 13/00* (2006.01)
(Continued)

(52) U.S. Cl.
CPC ....... *H04N 5/44543* (2013.01); *H04N 21/4314* (2013.01); *H04N 21/4821* (2013.01)

(58) Field of Classification Search
USPC .................................. 715/719–726
See application file for complete search history.

(56) References Cited

U.S. PATENT DOCUMENTS 5,479,268 A 12/1995 Young et al.
6,462,784 B1 * 10/2002 Kohno et al. ............. 348/563
(Continued)

FOREIGN PATENT DOCUMENTS

EP 1187467 A2 3/2002
EP 1420591 A1 5/2004
(Continued)

Primary Examiner — John Schnurr
Assistant Examiner — Christine Kurien (57) ABSTRACT

An EPG data processing device (D), for an electronic equipment (EE), comprises a processing means (PM) arranged i) to access to sets of data defining respectively channel programs and each comprising at least first data representative of a channel name and a channel program name, second data defining a channel program starting time, and third data representative of a channel program ending time, ii) either to determine amongst the accessed data sets which respectively follow each data set contributing to a displayed page of data the one which comprises the earliest ending time, in order to define a time reference just before this earliest ending time and associate this time reference to a following page of data to be displayed, or to determine amongst the accessed data sets which respectively precede each data set contributing to a displayed page of data the one which comprises the latest starting time, in order to define a time reference just after this latest ending time and associate this time reference to a preceding page of data to be displayed, iii) then to select amongst the accessed data sets each data set comprising second and third data defining a time interval including the defined time reference, and iv) finally to deliver these selected data sets in order they could be respectively displayed on different dedicated lines of a page associated to the determined time reference.

16 Claims, 3 Drawing Sheets

(51) Int. Cl.
*H04N 5/445* (2011.01)
*H04N 21/431* (2011.01)
*H04N 21/482* (2011.01)

(56) References Cited

U.S. PATENT DOCUMENTS 6,483,548 B1   11/2002  Allport
6,857,128 B1*  2/2005   Borden et al. .................. 725/39
7,197,759 B2   3/2007   Barrett et al.
2002/0087982 A1  7/2002  Stuart
2004/0055007 A1*  3/2004  Allport .......................... 725/39
2004/0100485 A1  5/2004  Allport
2005/0054062 A1  3/2005  Gerba et al.

FOREIGN PATENT DOCUMENTS

WO   9730547  A1   8/1997
WO   9948287  A1   9/1999
WO   03092271 A1   11/2003

* cited by examiner

DEVICE FOR PROCESSING ELECTRONIC PROGRAM GUIDE DATA TO BE DISPLAYED BY AN ELECTRONIC EQUIPMENT WITHIN PAGES ASSOCIATED TO TIME REFERENCES

The present invention relates to the domain of electronic program guides (or EPGs), and more precisely to the processing of EPG data intended to be displayed by electronic equipments.

More and more electronic equipments, such as Set-top boxes, television receivers, DVD recorders, or computers with television receivers, integrate an electronic program guide (EPG) data processing device (hereafter "device") to deliver data to be displayed in order to inform their users on broadcast contents. The quantity of information data that has to be presented to an electronic equipment user depends on the number of channels that can be received by the electronic equipment. So this information data quantity may be important.

In order a user can easily navigate amongst an important quantity of information data the device must offer three characteristics: it needs to be fast in order the user be able to quickly reach the information he needs (this is a speed characteristic), it needs to present every information data in order the user do not miss any information when he navigates within the information data (this is a completeness characteristic: all the programmes of the received channels must be displayed), and it needs to present on a same page channel programmes that are broadcast during a same part of the day (this is a coherence characteristic).

Moreover, the navigation must be easy to apprehend, so that the user can intuitively use it. For instance, it is important for the user to easily find again information data he has already seen during navigation.

Most of the known devices deliver EPG data in the form of grids. A grid comprises lines dedicated to different channels and each displaying the channel programmes in successive cells whose respective widths are proportional to the duration of the programme they contain. This displaying method seems nice at first sight because it allows a quick overview of a part of the day. However, this way of displaying information data can be disturbing since short programmes become hard to distinguish into the grid.

It has been also proposed to display all the programmes of a channel on a page. In this case the user has to navigate within numerous pages to see all the channel programmes. So, the user can not have an overview of what is or will be broadcast at a given time.

It has been further proposed to dedicate one line per channel, and to display only one programme on each line. In this case different types of navigation can be used to access the next programmes.

A first type comprises the devices which associate a time marker to each data set contributing to a page, in order to jump to the next time marker when the user requires the following programmes to be displayed. This allows the user to navigate very quickly amongst the programmes if the time interval between two consecutive markers is large enough. However, the larger the time interval, the more programmes are susceptible to be missed (programmes shorter than the time interval can easily be skipped). In this first type of device the coherence characteristic is ensured, but depending on the size of the time interval, either the completeness characteristic or the speed characteristic is lost.

A second type comprises the devices which allow to display, for each channel, the programme that follows a currently displayed programme, each time the user requires a next page. This avoids missing programmes and thus ensures the completeness characteristic. This also ensures the speed characteristic because navigation from page to page may be as fast as desired by the user. However, the coherence characteristic is in most of the cases rapidly lost, as soon as the programmes of the different channels have different durations.

A third type comprises the devices which allow to replace the currently displayed programme of each channel with the next programme when this currently displayed programme is the first to end, while leaving the others displayed programmes unchanged. This solution preserves the coherence characteristic and the completeness characteristic, but this solution can turn out to be very slow.

None of the known solutions is satisfying, since none of them offers simultaneously the three above cited characteristics (coherence, completeness and speed) which allow a user-friendly navigation between the displayed information data. Therefore this invention aims at providing an electronic program guide (EPG) data processing device which offers a navigation complying to the three above cited characteristics, while remaining easy to understand for the user.

For this purpose, it provides an electronic program guide data processing device (hereafter "device") for an electronic equipment, comprising a processing means arranged:

to access to sets of data defining respectively channel programmes and each comprising at least first data representative of a channel name and a channel programme name, second data defining a channel programme starting time, and third data representative of a channel programme ending time, either to determine amongst the accessed data sets which respectively follow each data set contributing to a displayed page of data the one which comprises the earliest ending time, in order to define a time reference just before this earliest ending time and associate this time reference to a following page of data to be displayed, or to determine amongst the accessed data sets which respectively precede each data set contributing to a displayed page of data the one which comprises the latest starting time, in order to define a time reference just after this latest ending time and associate this time reference to a preceding page of data to be displayed, then to select amongst the accessed data sets each data set comprising second and third data defining a time interval including the defined time reference, and finally to deliver these selected data sets in order they could be respectively displayed on different dedicated lines of a page associated to the determined time reference.

The device according to the invention may include additional characteristics considered separately or combined, and notably:

its processing means may be arranged to deliver the selected data sets in order each of them could be displayed into a cell of the page line which is dedicated to its channel;

its processing means may be arranged to attribute i) either a first type of cell, intended for occupying a full page line, to each selected data set which contributes to a displayed page and also to both a preceding page and a following page, ii) or a second type of cell, intended for partly occupying a page line, to each selected data set which only contributes to a displayed page, and third and fourth types of cell to be displayed respectively just before and just after the second type of cell but on the same page line thereof, iii) or else a fifth type of cell, intended for partly occupying a page line, to each selected data set which contributes to a displayed page and also to a preceding page but not to a following page, and a fourth type of cell to be displayed just after the fifth type of cell but on the same page line thereof, iv) or else a sixth type of cell, intended for partly occupying a page line, to each selected data set which contributes to a displayed page and also to a following page but not to a preceding page, and a third type of cell to be displayed just before the sixth type of cell but on the same page line thereof, its processing means may be arranged to deliver first auxiliary data representative of a selected programme date and/or second auxiliary data representative of the week day of the selected programme date and/or third auxiliary data representative of the position of the time reference of the displayed page within at least a part of the 24 hours of the selected day;

when its processing means receives a request asking for data sets to be displayed in order to define a new page following a currently displayed page, it is arranged to deliver the selected data sets and auxiliary data in such a way that the cell associated to a data set corresponding to a new following programme be displayed in an animated way by moving on the corresponding displayed page line from its right part to its left part;

when its processing means receives a request asking for data sets to be displayed to define a new page preceding a displayed page, it is arranged to deliver the selected data sets and auxiliary data in such a way that the cell associated to a data set corresponding to a new preceding programme be displayed in an animated way by moving on the corresponding displayed page line from its left part to its right part.

The invention also provides an electronic equipment comprising an EGP data processing device such as the one above introduced.

Other features and advantages of the invention will become apparent on examining the detailed specifications hereafter and the appended drawings, wherein:

The appended drawings may not only serve to complete the invention, but also to contribute to its definition, if need be.

Figure 1:
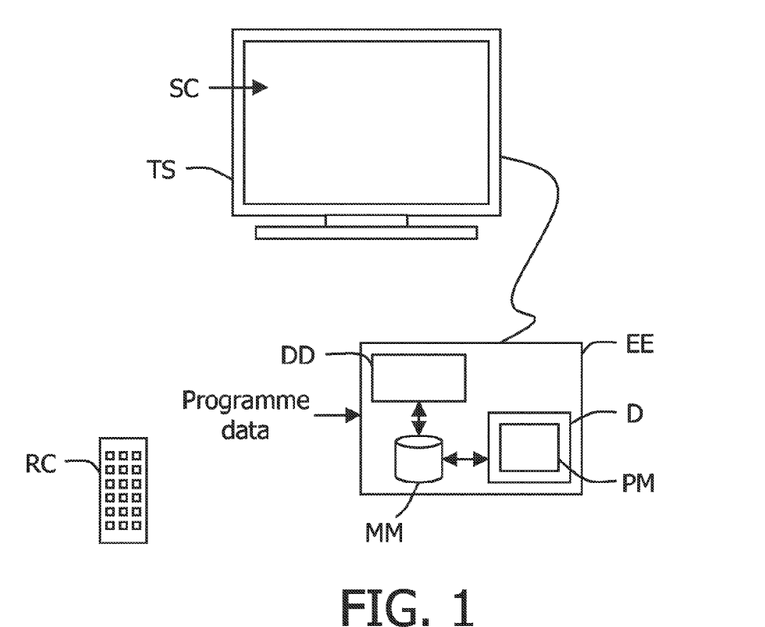
FIG. 1 schematically illustrates an electronic equipment provided with an example of embodiment of an EGP data processing device according to the invention, FIG. 2 schematically illustrates a first example of a displayed page according to the invention, FIGS. 3A to 3D schematically illustrate the mechanism which allows the definition of three different time references starting from a first one (TR(n)) in an example of a partial grid of three consecutive programmes of 8 channels, FIG. 4 schematically illustrates a second example of a displayed page corresponding to an intermediate situation between the displayed pages illustrated in FIGS. 2 and 5, and FIG. 5 schematically illustrates a third example of a displayed page following the one illustrated in FIG. 2.

Reference is initially made to FIG. 1 to briefly describe an electronic equipment EE in which the invention may be applied.

It is recall that the invention relates to electronic program guides (or EPGs) which may be displayed by a lot of electronic equipments EE such as consumer electronic products. In the following description it will be considered that the electronic equipment EE is a digital TV Set-top box intended for receiving and decoding digital broadcast television (TV) programmes of numerous channels through a digital decoder DD. But it is important to notice that the invention is not limited to this type of electronic equipment. Indeed the invention may apply to any electronic equipment, mobile or not, which is coupled to a TV set or acts as a television, and notably to a television receiver, a DVD recorder, or a personal computer or a mobile phone provided with a television receiver, eventually intended to be installed into a vehicle such as a car, a bus, a truck, a train or a plane.

For instance the digital TV Set-top box EE is connected to a digital TV broadcasting network (satellite or cable). It receives broadcast digital encoded data from the network, decodes the encoded data transmitted by the channel chosen by the user of the TV set TS to which it is connected to, by means of its digital decoder DD, and feeds the TV set TS with the digital decoded data in order it displays on its screen SC the chosen channel programme.

The digital TV Set-top box EE also receives information data defining the programmes of each received channel from the network, and stores them into a memory means MM. Each channel programme is notably defined by a data set comprising at least first data representative of the channel name and the channel programme name, second data defining a channel programme starting time, and third data representative of a channel programme ending time (it may be the ending time itself and/or the duration of the programme).

In the illustrated (and non limiting) example, the digital TV Set-top box EE comprises an electronic program guide (EPG) data processing device (hereafter "device") D intended for delivering data sets, selected into the memory means MM (in this non limiting example), to the TV set TS in order they could be displayed on its screen SC.

For this purpose, the device D comprises a processing module PM which is arranged to access to the data sets, stored into the memory means MM and defining respectively the programmes of the received channels, in order to select those corresponding to the user choice defined by means of a remote control case RC of the electronic equipment EE, for instance.

It is important to notice that the device D may be arranged to access to data sets which are not stored in its electronic equipment EE. Indeed, the data sets may be stored into a server which is accessible through a communication network, such as an Internet (IP) network, eventually through another communication network, such as a telecommunication network.

Preferably, when the user accesses to the EPG, the first page, which is displayed on the screen SC, comprises the channel programmes that are currently broadcast by the network, i.e. at the time and date of the access.

Figure 2:
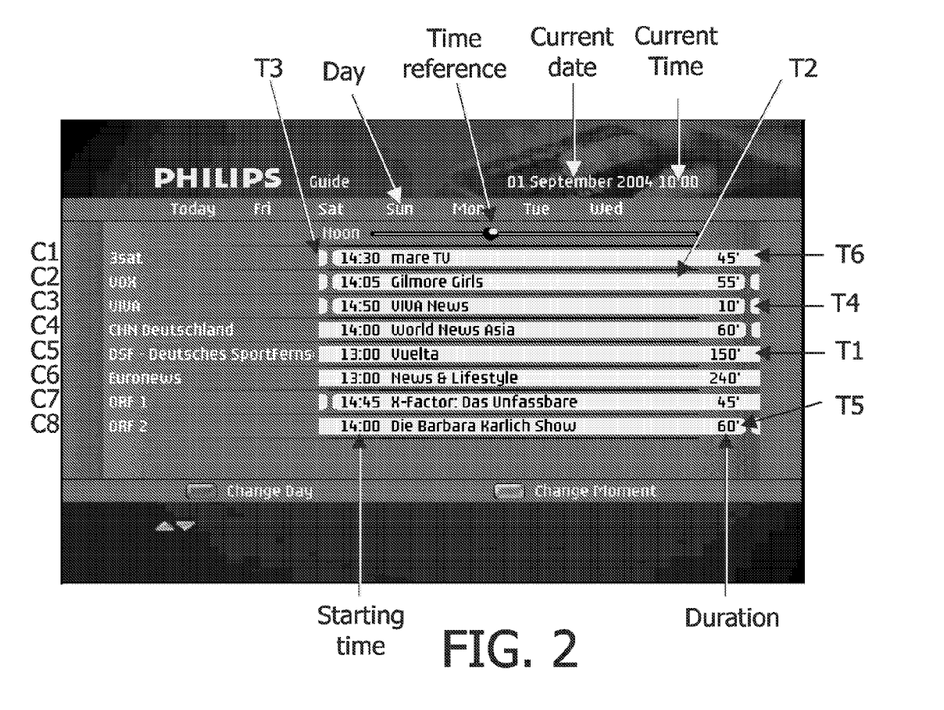

As it is illustrated in FIG. 2, a page according to the invention comprises different lines respectively dedicated to different channels Ci (in this non limiting example i=1 à 8, but i only requires to be greater than 1) and each comprising a data set defining a channel programme, i.e. at least first data representative of the channel programme name, second data defining the channel programme starting time, and third data defining the channel programme duration and/or ending time. A page comprises also preferably the week day to facilitate the browsing to the user. It may also comprise the current time and/or the current date. All these data to display are delivered by the device D.

According to the invention, the processing module PM of the device D is arranged to associate a time reference TR to each page to be displayed. As it is illustrated in FIG. 2, an information representative of this time reference TR may be also displayed on the associated page. It is not really interesting for the user to know exactly the time reference TR. Moreover, it is not mandatory that the time reference TR be exactly the same if the user go back and forth between two pages. For instance, the time reference TR may be materialized by a slide or a pointer whose position on a line is representative of the time to which it corresponds approximately within a day. In the example illustrated in FIG. 2, the beginning of this line represents 06:00 am.

The mechanism implemented by the processing module PM to define a time reference TR associated to a page depends on the command transmitted by the user by means of the remote control case RC. More precisely, it depends whether the user wants to see a page which follows or precedes the currently displayed page. In order to transmit its command to the device D, the user may operate left/right keys of the remote control case RC, for instance. As a displayed page contains a limited number of lines dedicated to a group of programmes, the user may also operate up/down keys of the remote control case RC to move (up/down) from one group of programmes to another while keeping the time reference TR constant.

When the user requires the following page, the processing module PM determines amongst the (stored) data sets those who immediately follow the data sets which contribute to the currently displayed page. Then it determines amongst these "following" data sets the one which comprises the third data representative of the earliest ending time. By "earliest ending time" it is meant the ending time which occurs in the first place amongst the ending times of the channel programmes which immediately follow the currently displayed channel programmes.

Then the processing module PM defines a new time reference TR(n+1) just before this earliest ending time and associates this time reference TR(n+1) to the following page to be displayed. By "just before" it is meant a time duration before the earliest ending time which, for instance, depends on the granularity of the broadcast data. So, the time duration may be equal to few seconds (for instance between 2 and 5 seconds before) if the programme timetables are more precise than one minute, or equal to few tens of second (for instance 20 or 30 seconds before) if the programme timetables are minute-precise.

Figure 3A:
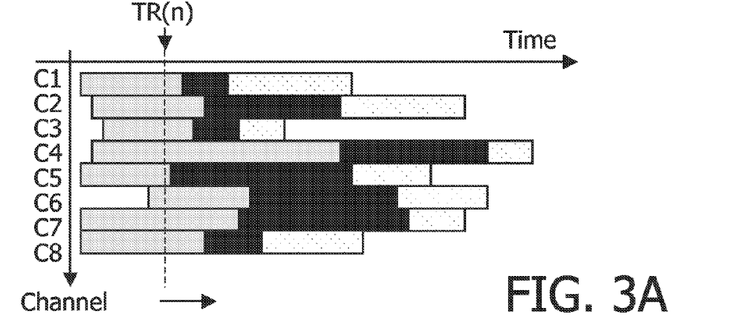
Figure 3B:
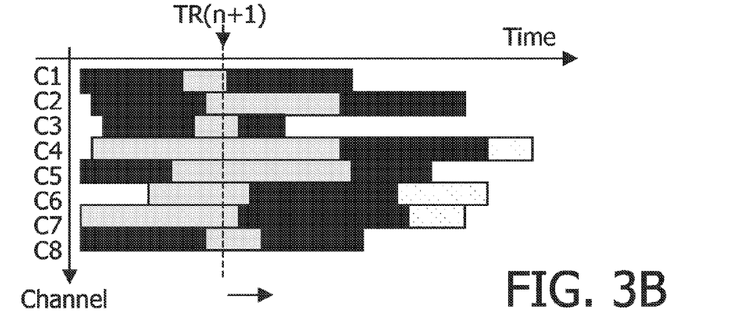
Figure 3C:
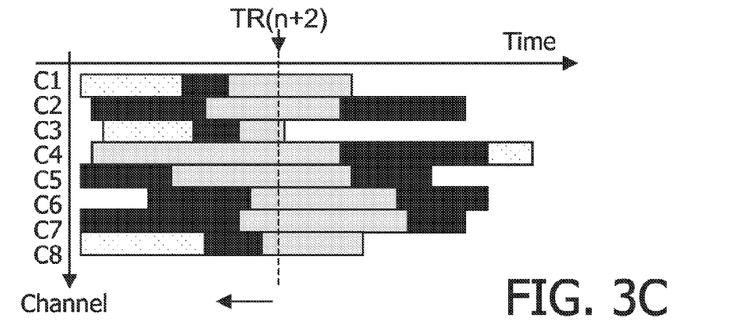

This time reference definition mechanism is illustrated in FIGS. 3A to 3C. In this example, three successive programmes of 8 channels C1-C8 (Ci) are materialized in the form of a grid in which each cell represents a channel programme and the width of each cell is proportional to the duration of the programme it represents. Moreover, the cells (or programmes) of each channel, which contribute to the currently displayed page associated to the time reference TR(n), are grey, the channel cells which immediately follow or precede the grey cells are black, and the channel cells which immediately follow or precede the black cells are white with dots. In other words, the grey cells represent the channel programmes which are displayed on a page.

When the user requires the page following the one associated to the time reference TR(n) in FIG. 3A, the processing module PM determines amongst the black cells which immediately follow the grey cells the one which comprises the earliest ending time. In this example the black cell which ends in the first place belongs to the first channel C1. Then the processing module PM defines a new time reference TR(n+1) just before the ending time of the second (black) cell of the first channel C1, as illustrated in FIG. 3B, and associates this time reference TR(n+1) to the following page to be displayed.

Once the processing module PM has defined the new time reference TR(n+1), it selects amongst the data sets each one comprising second data (starting time) and third data (ending time) defining a time interval including this defined time reference TR(n+1). Then it delivers these selected data sets in order they could be respectively displayed on the different lines of a new page by the TV set TS, under display control of the digital Set-top box EE. In the example illustrated in FIG. 3B, the cells selected to contribute to the new (following) page are grey. Here a new programme is selected in each channel excepted in the fourth one C4, the sixth one (C6) and the seventh one (C7) because the ending time of their respective first programmes occurs after the new time reference TR(n+1).

If the user requires a new page following the one associated to the time reference TR(n+1) in FIG. 3B, the processing module PM determines amongst the black cells which immediately follow the grey cells (in FIG. 3B) the one which comprises the earliest ending time. In this example the black cell which ends in the first place belongs to the third channel C3. Then the processing module PM defines a new time reference TR(n+2) just before the ending time of the third (black) cell of the third channel C3, as illustrated in FIG. 3C, and associates this time reference TR(n+2) to the new following page to be displayed.

Once the processing module PM has defined the new time reference TR(n+2), it selects amongst the data sets each one comprising second data (starting time) and third data (ending time) defining a time interval including this newly defined time reference TR(n+2). Then it delivers these selected data sets in order they could be respectively displayed on the different lines of a new page by the TV set TS, through the digital Set-top box EE. In the example illustrated in FIG. 3C, the cells selected to contribute to the new (following) page are grey. Here a new programme to display is selected in channels C1, C3, C6, C7 and C8, because the ending times of the programmes of the other channels C2, C4, and C5, which where contributing to the preceding page, occur after the new time reference TR(n+2).

Now, when the user requires a page which precedes a currently displayed one, the processing module PM determines amongst the (stored) data sets those who immediately precede the data sets which contribute to the currently displayed page. Then it determines amongst these "preceding" data sets the one which comprises the second data representative of the latest starting time. By "latest starting time" it is meant the starting time which occurs in the last place amongst the starting times of the channel programmes which immediately precede the currently displayed channel programmes.

Then the processing module PM defines a new time reference TR(n−1) just after this latest starting time and associates this time reference TR(n−1) to the following page to be displayed. By "just after" it is meant a time duration after the latest ending time which, for instance, depends on the granularity of the broadcast data. So, the time duration may be equal to few seconds (for instance between 2 and 5 seconds after) if the programme timetables are more precise than one minute or equal to few tens of second (for instance 20 or 30 seconds after) if the programme timetables are minute-precise.

Figure 3D:
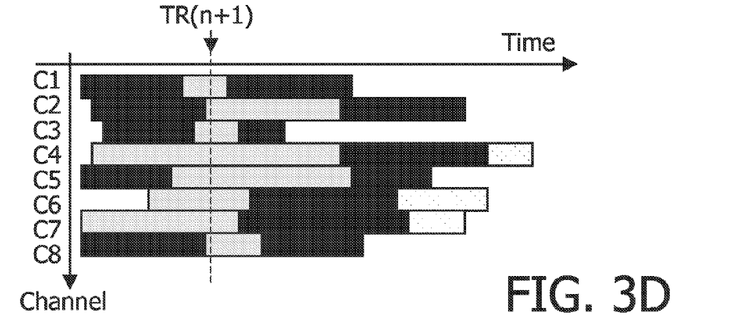

This time reference definition mechanism is illustrated in FIGS. 3C and 3D with the same conventions than those used in FIGS. 3A to 3C.

When the user requires the page preceding the one associated to the time reference TR(n+2) in FIG. 3C, the processing module PM determines amongst the black cells which immediately precede the grey cells the one which comprises the latest starting time. In this example the black cell which starts in the last place belongs to the eighth channel C8. Then the processing module PM defines a new time reference TR(n+1) just after the starting time of the second (black) cell of the eighth channel C8, as illustrated in FIG. 3D, and associates this time reference TR(n+1) to the preceding page to be displayed.

Once the processing module PM has defined the new time reference TR(n+1), it selects amongst the data sets each one comprising second data (starting time) and third data (ending time) defining a time interval including this defined time reference TR(n+1). Then it delivers these selected data sets in order they could be respectively displayed on the different lines of a new page by the TV set TS, through the digital Set-top box EE. In the example illustrated in FIG. 3D, the cells selected to contribute to the new (following) page are grey. Here a new programme to display is selected in channels C1, C3, C6, C7 and C8, because the starting times of the programmes of the other channels C2, C4, and C5, which where contributing to the preceding page, occur before (earlier) the new time reference TR(n+1).

Figure 4:
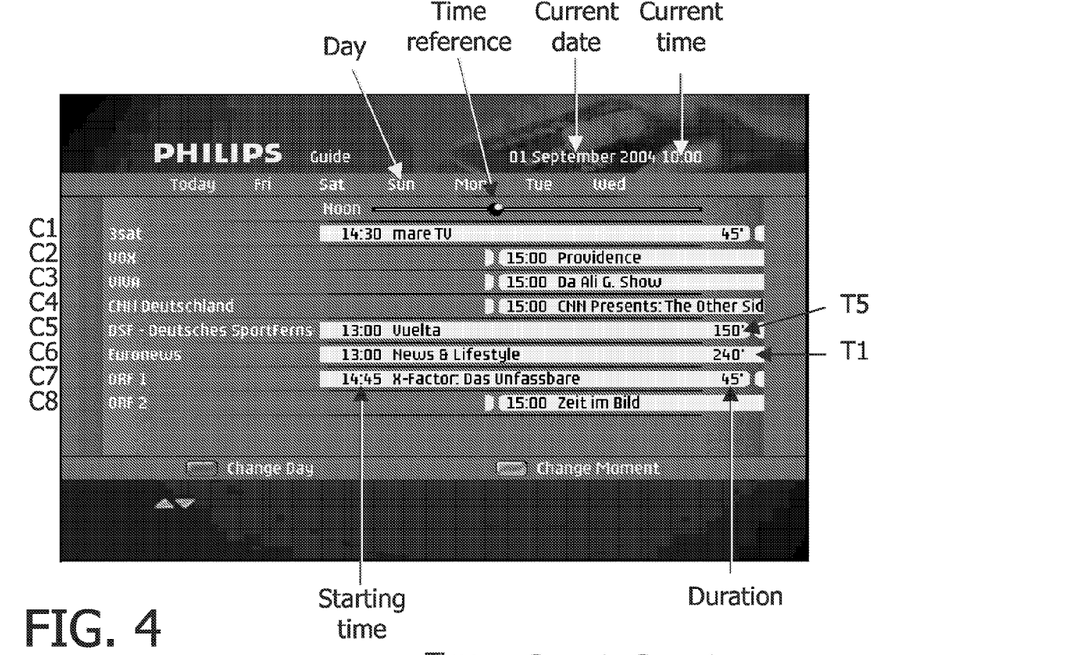
Figure 5:
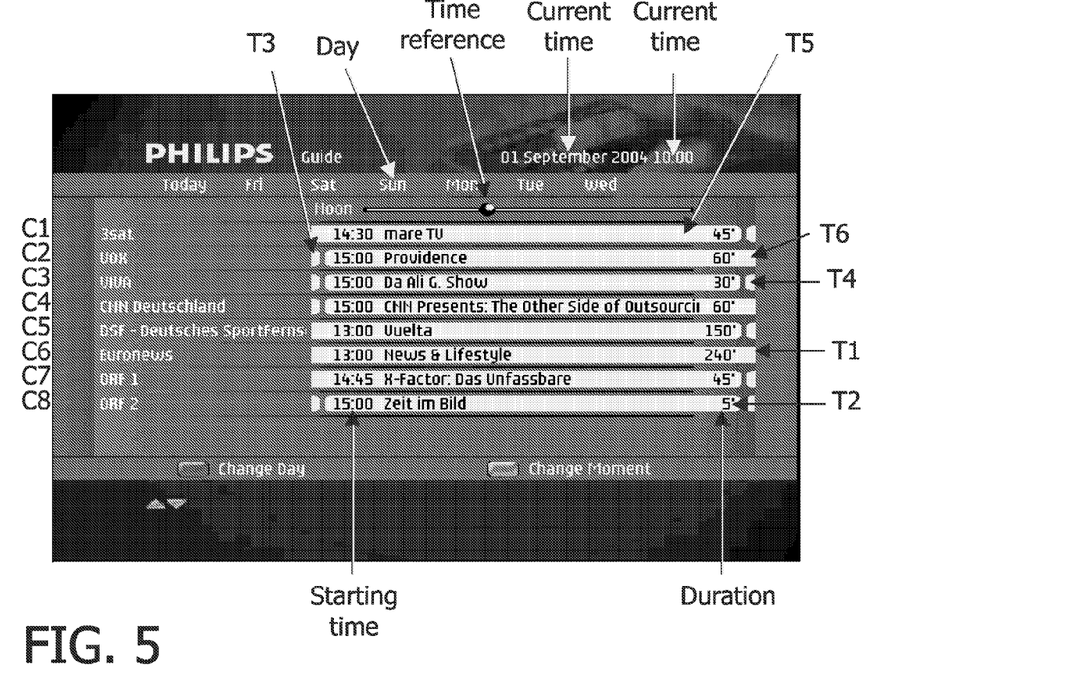

As it is illustrated in FIGS. 2, 4 and 5, the processing module PM preferably delivers each selected data set in such a way that it could be displayed into one cell of the page line which is dedicated to its channel. In other words there is only one cell in each page line which contains information representative of a channel programme (or else the processing module PM displays only one programme for each displayed channel at a time). This cell containing information may occupy the full line (T1) or a part of it (T2, T5 and T6).

For instance, the processing module PM may attribute:
  a first type of cell T1, intended for occupying a full page line, to each selected data set which contributes to a displayed page and also to both a preceding page and a following page. This first type of cell T1 indicates to the user that the displayed channel programme will remain the same if it goes onto the following or preceding page;
  a second type of cell T2, intended for partly occupying a page line, to each selected data set which only contributes to a displayed page, and third T3 and fourth T4 types of (truncated) cell to be displayed respectively just before and just after the second type of cell T2 but on the same page line thereof. This second type of cell T2, sandwiched between third T3 and fourth T4 types of cells, indicates to the user that the displayed channel programme will change if it goes onto the following or preceding page;
  a fifth type of cell T5, intended for partly occupying a page line, to each selected data set which contributes to a displayed page and also to a preceding page but not to a following page, and a fourth type of cell T4 to be displayed just after the fifth type of cell T5 but on the same page line thereof. This fifth type of cell T5, followed by a fourth type of cell T4, indicates to the user that the displayed channel programme will change if it goes onto the following page but will remain unchanged if it goes onto the preceding page;
  a sixth type of cell T6, intended for partly occupying a page line, to each selected data set which contributes to a displayed page and also to a following page but not to a preceding page, and a third type of cell T3 to be displayed just before the sixth type of cell T6 but on the same page line thereof. This sixth type of cell T6, preceded by a third type of cell T3, indicates to the user that the displayed channel programme will change if it goes onto the preceding page but will remain unchanged if it goes onto the following page.

It is impossible to have a T1 cell with a T3 cell or T4 cell, nor a T5 cell with a T3 cell, nor a T6 cell with a T4 cell. On the contrary, a T5 cell is necessarily accompanied with a T4 cell, a T6 cell with a T3 cell, and a T2 cell with both T3 cell and T4 cell.

It is important to notice that this kind of display of information (truncated cell) to draw attention onto available preceding and following channel programmes, is an example. Other kinds of display may be envisaged. More generally, any graphical asset showing that something will happen can be used.

In order to draw the attention of the user on the channel programmes that are changing when it goes onto a new following or preceding page, the processing module PM may used animated transitions. In this case, the cell which contains the information data representative of the new channel programme can be displayed in an animated way by moving on its dedicated page line either from its right part to its left part, when the page follows the previously displayed one, or from its left part to its right part, when the page precedes the previously displayed one.

An intermediate display of a page, following the one illustrated in FIG. 2, is illustrated in FIG. 3. In the example illustrated in FIG. 2, the user sees that the page lines dedicated to channels C2, C3, C4 and C8 comprises truncated cells of the fourth type T4 which indicates that if he goes onto the next following page he will see new programmes on the lines dedicated to channels C2, C3, C4 and C8. If he decides to go onto the following page the cells, containing the information data representative of the programmes of channels C2, C3, C4 and C8, appear progressively from the right side of the corresponding page lines, as illustrated in FIG. 3, until being entirely represented as illustrated in FIG. 4.

It is important to notice that the information data representative of a channel programme may remain unchanged when the processing module PM delivers the data sets contributing to a new page, while the type of the cell, which contains this unchanged information data, changes. This results from the fact that a new programme may become available on the following and/or preceding page.

Such a situation occurs in the examples illustrated in FIGS. 2 and 4. More precisely, in these examples:
  the programme of the first page line remains unchanged but the cells of the third T3 and sixth T6 types become cells of the fifth T5 and fourth T4 types. So the user knows that the displayed channel programme will change if it goes onto the following page,
  the programme of the fifth page line remains unchanged but the first type of cell T1 becomes cells of the fifth T5 and fourth T4 types. So the user knows that the displayed channel programme will change if it goes onto the following page,
  the programme of the sixth page line remains unchanged such as the first type of cell T1. So the user knows that the displayed channel programme will remain the same if it goes onto the following or preceding page,
  the programme of the seventh page line remains unchanged but the cells of the third T3 and sixth T6 types become cells of the fifth T5 and fourth T4 types. So the user knows that the displayed channel programme will change if it goes onto the following page.

It is important to notice that the (main) cell, which contains the information data, may comprise the programme duration and/or the programme ending time.

As mentioned before and as illustrated in FIGS. 2, 3 and 4, in addition to the selected data sets intended to contribute to a displayed page, the processing module PM may also deliver first auxiliary data representative of a programme date eventually selected by the user, and/or second auxiliary data representative of the week day of the programme date eventually selected by the user, and/or third auxiliary data representative of the position of the time reference TR of the displayed page within at least a part of the 24 hours of the day eventually selected by the user.

In order to select a date or a part of a day the user may activate dedicated keys of the remote control case.

The device D and notably its processing module PM may be realized with software modules, or hardware modules, or else a combination of hardware and software modules.

The invention is not limited to the embodiments of electronic program guide data processing device and electronic equipment described above, only as examples, but it encompasses all alternative embodiments which may be considered by one skilled in the art within the scope of the claims hereafter.

The invention claimed is:

1. Electronic program guide (EPG) data processing device (D) for an electronic equipment (EE), comprising: a processing means (PM) arranged
   i) to access sets of data defining respectively channel programmes, wherein each set of data comprises at least first data representative of a channel name and a channel programme name, second data defining a channel programme starting time, and third data representative of a channel programme ending time, wherein responsive to a user access to the EPG, to (a) initially display a current page of data that comprises only channel programmes that are currently broadcast at a time and date of the user access, and (b) associate an initial time reference with the currently displayed page, wherein only one programme is displayed at a time for each displayed channel per respective dedicated line of the currently displayed page of data associated with the initial time reference,
   ii) to determine and define a new time reference via
      (ii)(a) with respect to a following page of data to be displayed, to determine, based on second data of a respective data set, an earliest ending time data set amongst the accessed data sets which respectively immediately follow each data set contributing to a currently displayed page of data that has a current associated time reference, wherein the earliest ending time data set has an earliest ending time of a data set amongst ending times of respective accessed data sets which respectively immediately follow each data set contributing to the currently displayed page of data, and to define the new time reference as a time just before said earliest ending time, and to associate this new time reference to the following page of data to be displayed, and
      (ii)(b) with respect to a preceding page of data to be displayed, to determine, based on third data of a respective data set, a latest starting time data set amongst the accessed data sets which respectively immediately precede each data set contributing to a currently displayed page of data that has a current associated time reference, wherein the latest starting time data set has a latest starting time of a data set amongst starting times of respective accessed data sets which respectively immediately precede each data set contributing to the currently displayed page of data, and to define the new time reference as a time just after said latest starting time, and to associate this new time reference to the preceding page of data to be displayed,
   iii) to select amongst said accessed data sets, for a corresponding following page of data or a corresponding preceding page of data, each data set comprising second and third data defining a time interval that includes said defined new time reference associated with a new page of data to be displayed, and
   iv) to deliver said selected data sets associated with said defined new time reference for respectively displaying each selected data set on different dedicated lines of the new page associated with said defined new time reference, wherein only one programme is displayed at a time for each displayed channel per respective dedicated line of the new page associated with said defined new time reference.

2. The device according to claim 1, wherein said processing means (PM) is arranged to deliver said selected data sets in order that each data set is displayed into a corresponding cell of the page line dedicated to its channel.

3. The device according to claim 2, wherein further said processing means (PM) is arranged to attribute i) a first type of cell intended for occupying a full page line to each selected data set contributing to a displayed page and which also contributes to both a preceding page and a following page, ii) a second type of cell intended for partly occupying a page line to each selected data set only contributing to a displayed page, and third and fourth types of cell to be displayed respectively just before and just after said second type of cell but on the same page line thereof, iii) a fifth type of cell intended for partly occupying a page line to each selected data set contributing to a displayed page and which also contributes to a preceding page but not a following page, and a fourth type of cell to be displayed just after said fifth type of cell but on the same page line thereof, and iv) a sixth type of cell intended for partly occupying a page line to each selected data set contributing to a displayed page and which also contributes to a following page but not to a preceding page, and a third type of cell to be displayed just before said sixth type of cell but on the same page line thereof.

4. The device according to claim 1, wherein said processing means (PM) is arranged to deliver at least one of (i) first auxiliary data representative of a selected programme date, (ii) second auxiliary data representative of the week day of a selected programme date, and (iii) third auxiliary data representative of the position of the time reference of the displayed page within at least a part of the 24 hours of a selected day.

5. The device according to claim 1, wherein responsive to said processing means (PM) receiving a request asking for data sets to be displayed to define a new page following a currently displayed page, said processing means is arranged to deliver said selected data sets and auxiliary data in such a way that each cell associated to a data set corresponding to a new following programme be displayed in an animated way by moving each respective cell on the corresponding displayed page line from the right part thereof to the left part thereof.

6. The device according to claim 1, wherein responsive to said processing means (PM) receiving a request asking for data sets to be displayed to define a new page preceding a currently displayed page, said processing means is arranged to deliver said selected data sets and auxiliary data in such a way that each cell associated to a data set corresponding to a new preceding programme be displayed in an animated way by moving each respective cell on the corresponding displayed page line from the left part thereof to the right part thereof.

7. Electronic equipment (EE), comprising an electronic program guide data processing device (D) according to claim 1.

8. The device according to claim 2, wherein said processing means (PM) is arranged to deliver at least one of (i) first auxiliary data representative of a selected programme date, (ii) second auxiliary data representative of the week day of a selected programme date, and (iii) third auxiliary data representative of the position of the time reference of the displayed page within at least a part of the 24 hours of a selected day.

9. The device according to claim 3, wherein said processing means (PM) is arranged to deliver at least one of (i) first auxiliary data representative of a selected programme date, (ii) second auxiliary data representative of the week day of a selected programme date, and (iii) third auxiliary data representative of the position of the time reference of the displayed page within at least a part of the 24 hours of a selected day.

10. The device according to claim 2, wherein responsive to said processing means (PM) receiving a request asking for data sets to be displayed to define a new page following a currently displayed page, said processing means is arranged to deliver said selected data sets and auxiliary data in such a way that each cell associated to a data set corresponding to a new following programme be displayed in an animated way by moving each respective cell on the corresponding displayed page line from the right part thereof to the left part thereof.

11. The device according to claim 3, wherein responsive to said processing means (PM) receiving a request asking for data sets to be displayed to define a new page following a currently displayed page, said processing means is arranged to deliver said selected data sets and auxiliary data in such a way that each cell associated to a data set corresponding to a new following programme be displayed in an animated way by moving each respective cell on the corresponding displayed page line from the right part thereof to the left part thereof.

12. The device according to claim 4, wherein responsive to said processing means (PM) receiving a request asking for data sets to be displayed to define a new page following a currently displayed page, said processing means is arranged to deliver said selected data sets and auxiliary data in such a way that each cell associated to a data set corresponding to a new following programme be displayed in an animated way by moving each respective cell on the corresponding displayed page line from the right part thereof to the left part thereof.

13. The device according to claim 2, wherein responsive to said processing means (PM) receiving a request asking for data sets to be displayed to define a new page preceding a currently displayed page, said processing means is arranged to deliver said selected data sets and auxiliary data in such a way that each cell associated to a data set corresponding to a new preceding programme be displayed in an animated way by moving each respective cell on the corresponding displayed page line from the left part thereof to the right part thereof.

14. The device according to claim 3, wherein responsive to said processing means (PM) receiving a request asking for data sets to be displayed to define a new page preceding a currently displayed page, said processing means is arranged to deliver said selected data sets and auxiliary data in such a way that each cell associated to a data set corresponding to a new preceding programme be displayed in an animated way by moving each respective cell on the corresponding displayed page line from the left part thereof to the right part thereof.

15. The device according to claim 4, wherein responsive to said processing means (PM) receiving a request asking for data sets to be displayed to define a new page preceding a currently displayed page, said processing means is arranged to deliver said selected data sets and auxiliary data in such a way that each cell associated to a data set corresponding to a new preceding programme be displayed in an animated way by moving each respective cell on the corresponding displayed page line from the left part thereof to the right part thereof.

16. The device according to claim 5, wherein responsive to said processing means (PM) receiving a request asking for data sets to be displayed to define a new page preceding a currently displayed page, said processing means is arranged to deliver said selected data sets and auxiliary data in such a way that each cell associated to a data set corresponding to a new preceding programme be displayed in an animated way by moving each respective cell on the corresponding displayed page line from the left part thereof to the right part thereof.

* * * * *